W. H. MURPHY.
INTERNAL COMBUSTION MOTOR.
APPLICATION FILED MAR. 10, 1920.

1,430,747.

Patented Oct. 3, 1922.

Inventor;
Walter H. Murphy.
By, [signature]
Attorney.

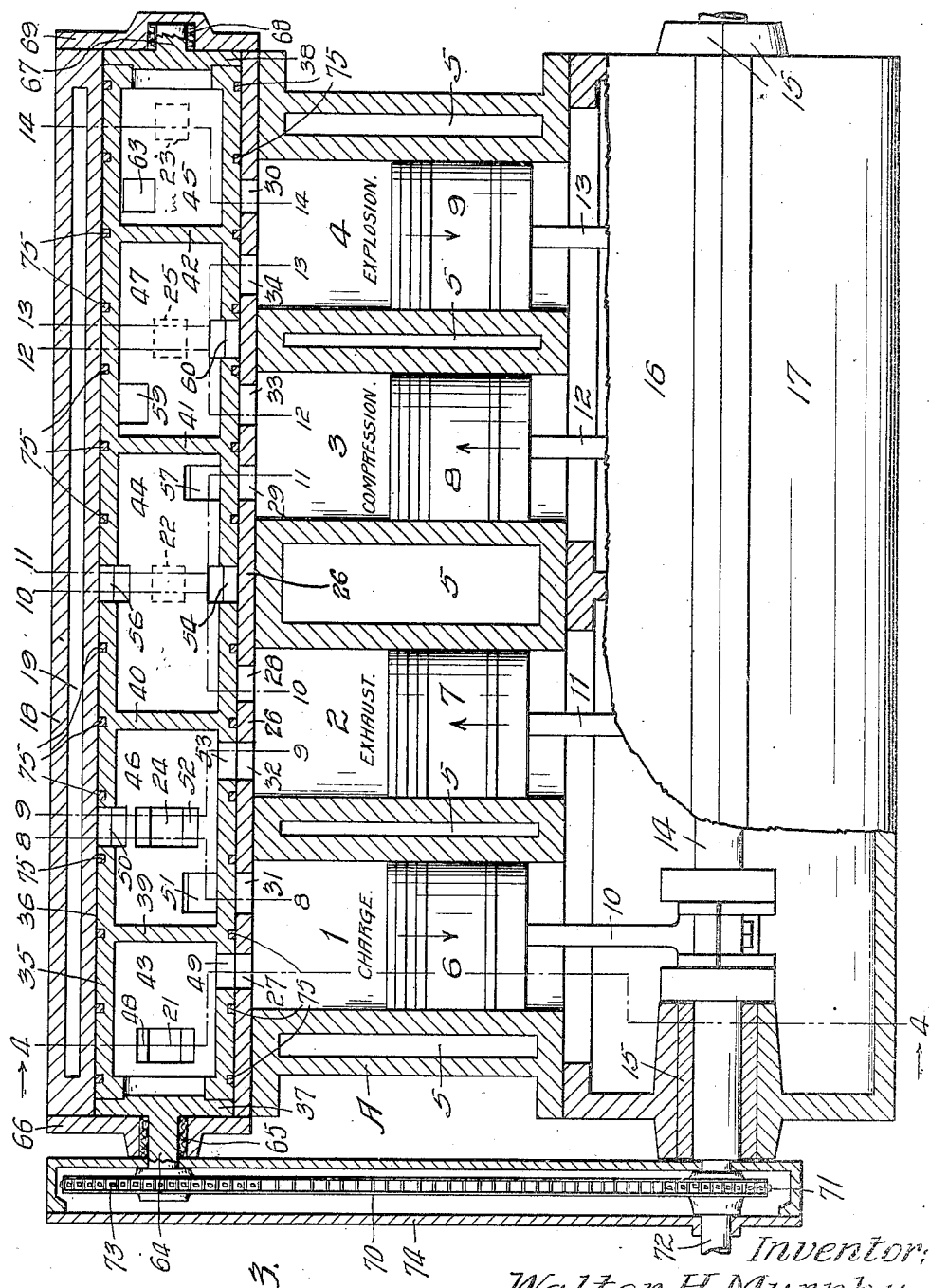

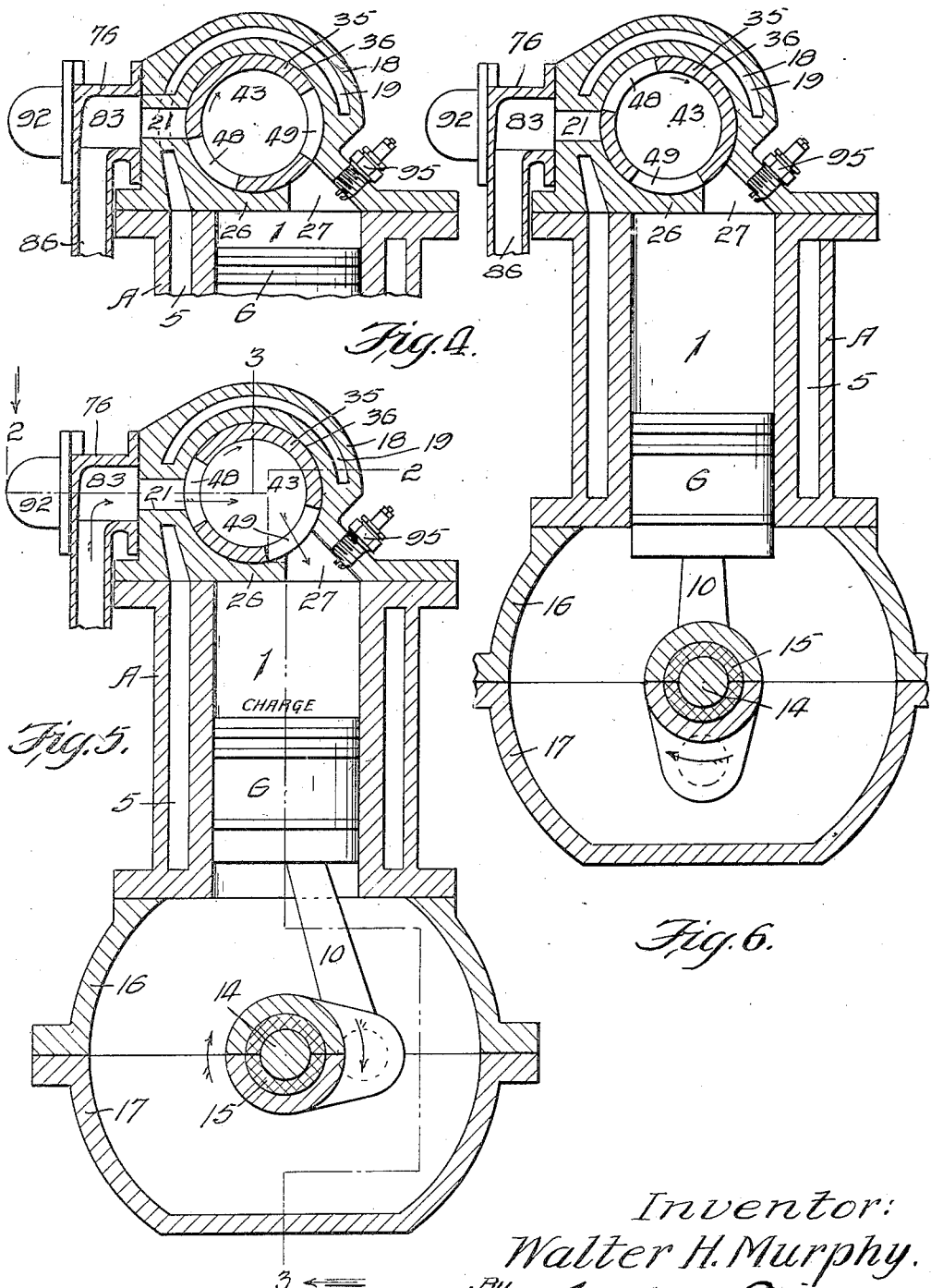

W. H. MURPHY.
INTERNAL COMBUSTION MOTOR.
APPLICATION FILED MAR. 10, 1920.
1,430,747.
Patented Oct. 3, 1922.
4 SHEETS—SHEET 4.
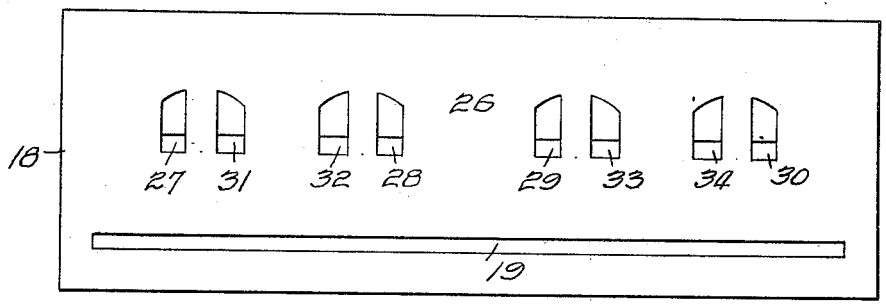
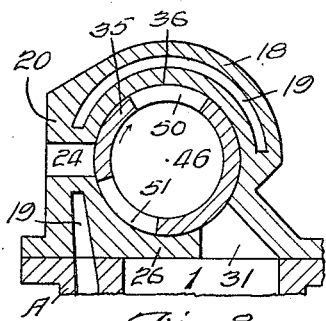
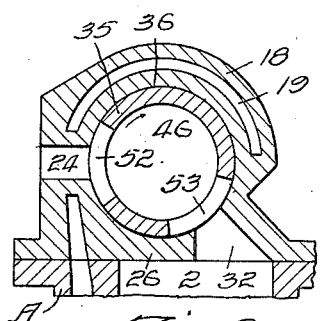
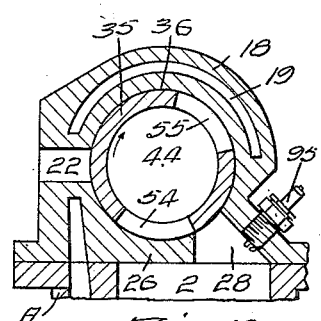
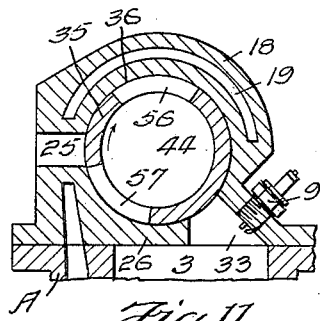
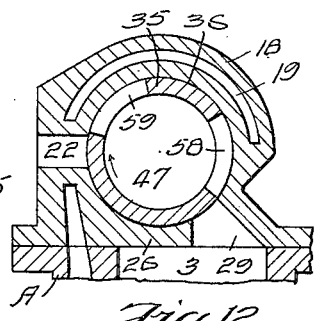
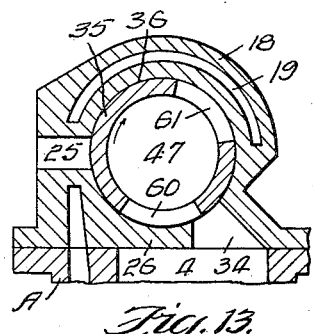
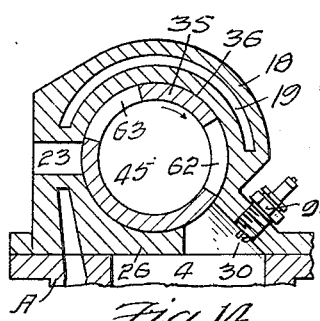
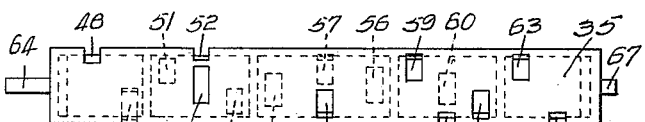
Inventor:
Walter H. Murphy.
By Fred'k J. Larson
Attorney.

Patented Oct. 3, 1922.

1,430,747

UNITED STATES PATENT OFFICE.

WALTER H. MURPHY, OF ST. LOUIS, MISSOURI, ASSIGNOR OF ONE-HALF TO ALONZO KINGSTON, OF ST. LOUIS, MISSOURI.

INTERNAL-COMBUSTION MOTOR.

Application filed March 10, 1920. Serial No. 364,743.

*To all whom it may concern:*

Be it known that I, WALTER H. MURPHY, a citizen of the United States, residing in the city of St. Louis and State of Missouri, have invented certain new and useful Improvements in Internal-Combustion Motors, of which the following is a specification.

My invention relates to internal combustion motors, and more particularly to a rotary valve therefor, and, has for its object to provide a rotary valve structure which is a distinct and practical improvement to overcome certain practical objections to, and defects in, the present form of rotary valves for internal combustion motors.

A further object of the invention is to provide a rotary valve having valve chambers for the intake gases to pass through on the way to the engine cylinders and separate valve chambers for the exhaust gases to pass through when being discharged from the engine cylinders, which arrangement of valve chambers insures reducing the exhaust gases discharged from the cylinders to a minimum and further insuring an absolutely fresh intake gas mixture being drawn into the engine cylinders when the gas intake ports are opened, thereby guarding against any intake gases being discharged with exhaust gases as the intake gases pass through one set of valve chambers while the exhaust gases pass through another separate set of valve chambers in the rotary valve.

A further object of the invention is to provide a rotary valve arrangement which will eliminate camshafts, springs, and the grinding of valves, which will positively close the ports in spite of carbon accumulation, permit the incoming charge, or gas mixture to enter the cylinders directly through the head of the cylinder, thus eliminating pockets, or offsets in the combustion chambers, permit the exhaust gases to leave the cylinders directly through the heads thereof and to cause the exhaust gases to super-heat the incoming gases from the carbureter as they pass through intake gas chambers of the intake manifold and valve chambers of the rotary valve.

With the above and other objects in view, the invention consists in the novel construction, arrangement and combination of parts hereinafter described and finally pointed out in the claim hereto appended.

Referring to the accompanying drawings forming a part of this specification wherein like characters of reference denote similar parts throughout the several views:

Fig. 3, is a longitudinal sectional view taken on line 3—3 of Fig. 5, and partly in side elevation of a four cylinder motor, showing the rotary valve constructed and arranged in accordance with my invention.

Fig. 4, is a sectional view taken on line 4—4 of Fig. 3, showing the piston at the uppermost end of its exhaust stroke and ready to descend to take a charge into the Number 1 cylinder and showing the location of the valve intake ports with relation to the manifold and cylinder ports, which are shown as about to open.

Fig. 5, is a sectional view taken in section line 4—4 of Fig. 3, showing the crank shaft at quarter turn which brings Number 1 piston in the center of a charge stroke and the intake ports of the rotary valve in registered relation with the manifold intake port and cylinder intake port of Number 1 cylinder.

Fig. 6, is also a sectional view taken on line 4—4 of Fig. 3, but showing the crank shaft at a half turn with piston in lowermost position and showing the ports of the valve as having closed by passing the manifold and cylinder intake ports of Number 1 cylinder.

Fig. 7, is a bottom plan view of the valve housing and cylinder head.

Fig. 8, is a sectional view taken on line 8—8 of Fig. 3, showing the positions of the valve ports with relation to the manifold and cylinder exhaust ports when the Number 1 piston is in the center of a charge stroke.

Fig. 9, is a sectional view taken on line 9—9 of Fig. 3, showing the relative positions of the valve exhaust ports with relation to the manifold exhaust port and Number 2 cylinder exhaust port when Number 2 piston is in the center of an exhaust stroke.

Fig. 10, is a sectional view taken on line

Figure 1:
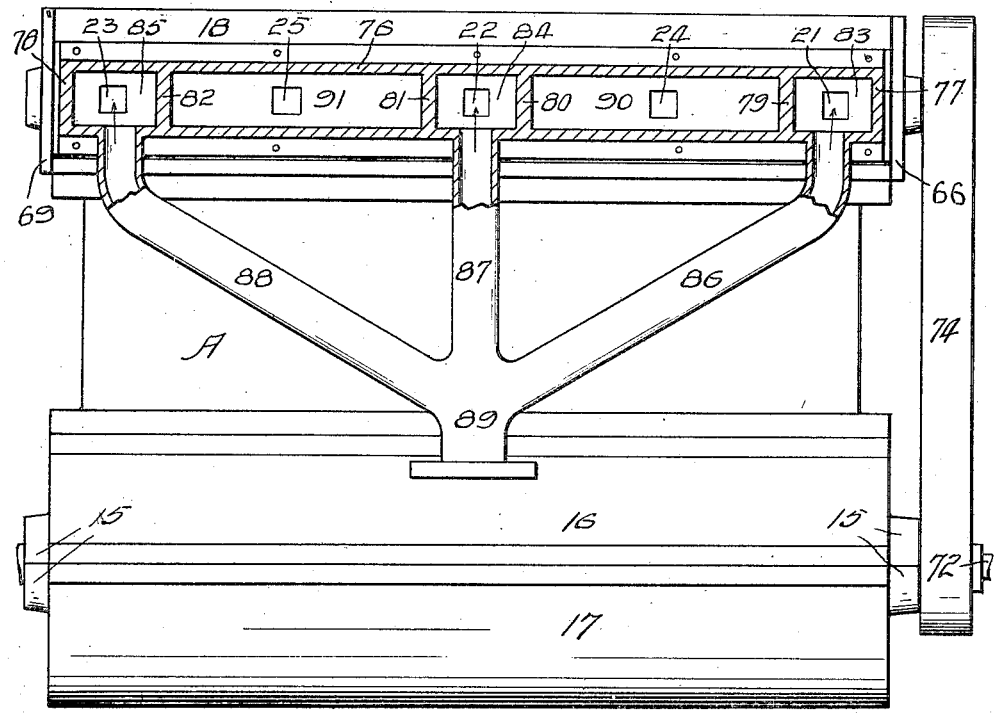
Fig. 1, is a side elevation of the motor looking from the carbureter side, showing the intake and exhaust chambers at the upper end of the intake pipes of the manifold in sectional elevation.

10—10 of Fig. 3, showing the relative positions of the valve intake ports with relation to the manifold intake port and Number 2 cylinder intake ports when Number 2 piston is in the center of an exhaust stroke.

Fig. 11, is a sectional view taken on line 11—11 of Fig. 3, showing the relative positions of the valve intake ports with relation to the Number 3 cylinder intake port and the manifold intake port for said cylinder when Number 3 piston is in the center of its compression stroke.

Fig. 12, is a sectional view taken on line 12—12 of Fig. 3, showing the relative positions of the valve exhaust ports with relation to the Number 3 cylinder exhaust port and the manifold exhaust port of said cylinder when Number 3 piston is in the center of its compression stroke.

Fig. 13, is a sectional view taken on line 13—13 of Fig. 3, showing the relative positions of the valve exhaust ports with relation to the Number 4 cylinder exhaust port and the manifold exhaust port for said cylinder, when the Number 4 piston is in the center of its power stroke.

Fig. 14, is a sectional view taken on line 14—14 of Fig. 3, showing the relative position of the valve intake ports with relation to the Number 4 cylinder intake port and the manifold intake port for said cylinder, when the Number 4 piston is in the center of its power stroke.

Fig. 15, is a plan view of the rotary valve showing the relative positions of the several valve intake and exhaust ports visible in this view.

Briefly, the invention consists of a valve housing provided with manifold intake and exhaust ports and with cylinder intake and exhaust ports and provided with a longitudinal bore within which rotates a tubular valve divided into a plurality of separate intake and exhaust chambers, each exhaust chamber being intermediate a pair of intake chambers so that two cylinders can exhaust into a single valve exhaust chamber, and of a manifold being provided with the same number of intake and exhaust chambers as the rotary valve. The rotary valve is driven from the crank shaft and makes but one revolution to two revolutions of the crank shaft, as the motor is of the four cycle type.

Referring to the accompanying drawings, the reference character A indicates a suitable engine block as provided, for illustrative purposes only, with four cylinders designated 1, 2, 3 and 4. 5 indicates a water chamber surrounding each cylinder wall. 6, 7, 8 and 9 indicate the pistons which reciprocate in the cylinders 1, 2, 3 and 4, respectively, while 10, 11, 12 and 13 indicate the connecting rods which connect the pistons 6, 7, 8 and 9, respectively, to the crank shaft 14, which crank shaft is journaled in the split bearings 15 supported by the upper and lower crank case halves 16 and 17 upon which the engine block A is mounted.

In carrying out the aim of my present invention, I employ a valve housing 18 which is mounted upon the top of the engine block and suitably fixed thereto. The valve housing acts also as the engine head, as is manifest, and is provided with the water chamber 19 which communicates with the water chamber 5 of the engine block, as clearly shown in Fig. 5.

Figure 2:
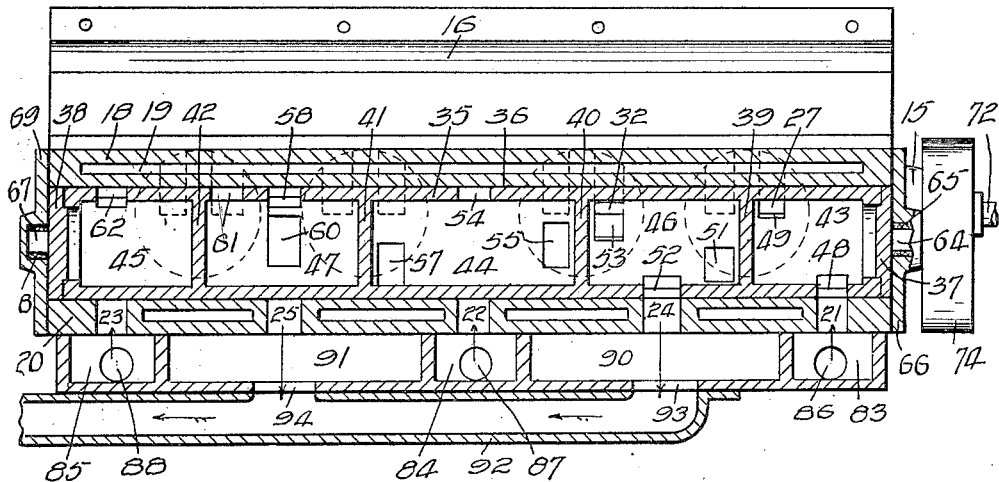
Fig. 2, is a plan view of the motor, showing the valve housing, rotary valve, and the intake and exhaust manifolds in section taken on line 2—2 of Fig. 5.

As clearly shown in Fig. 2, the valve housing 18 is provided in its side wall 20 with the manifold intake ports 21, 22 and 23 and the manifold exhaust ports 24 and 25. The manifold exhaust port 24 is positioned between the manifold intake ports 21 and 22, while the manifold exhaust port 25 is positioned between the manifold intake ports 22 and 23. As clearly shown in Fig. 3, the valve housing 18 is provided in its lower wall 26 with the cylinder intake ports 27, 28, 29 and 30 which ports communicate with the upper end of the cylinders 1, 2, 3 and 4, respectively. 31, 32, 33 and 34 indicate cylinder exhaust ports, which communicate with the upper end of the cylinders 1, 2, 3 and 4, respectively. It will be observed that the cylinder intake and exhaust ports are arranged in pairs, so that the two cylinder exhaust ports are positioned between each pair of cylinder intake ports, as clearly shown in Fig. 3. The cylinder intake and exhaust ports are positioned to one side of the longitudinal center of each cylinder when looking from the end of the motor and upon opposite sides of the longitudinal center of the cylinder when looking from either side of the motor, as clearly shown in Figs. 3, 5, 7 and 8 to 14, inclusive.

35 indicates a tubular rotary valve, which is rotatably mounted in the longitudinal bore 36 of the valve housing 18. The valve 35 is provided with the removable end walls 37 and 38 and with the partitions 39, 40, 41 and 42 to provide the valve intake chambers 43, 44 and 45 and the intermediate valve exhaust chambers 46 and 47.

The valve intake chamber 43 is capable of communicating with the manifold intake port 21 through a valve port 48 and with the Number 1 cylinder intake port 27 through a valve port 49. The relation of these ports are clearly shown in Fig. 5, as taken on line 4—4 of Fig. 3.

The valve exhaust chamber 46 is capable of communicating with the manifold exhaust port 24 through a valve port 50 and with the Number 1 cylinder exhaust port 31 through a valve port 51. The relation of these ports are clearly shown in Fig. 8, as taken on line 8—8 of Fig. 3.

The valve exhaust chamber 46 is also capable of communicating with the manifold exhaust port 24 through a valve port 52 and with the Number 2 cylinder exhaust port 32 through a valve port 53. The relation of these ports are clearly shown in Fig. 9, as taken on line 9—9 of Fig. 3.

The intake valve chamber 44 is capable of communicating with the manifold intake port 22 through a valve port 54 and with the Number 2 cylinder intake port 28 through a valve port 55. The relation of these ports are shown in Fig. 10, as taken on line 10—10 of Fig. 3.

The intake valve chamber 44 is further capable of communicating with the manifold intake port 22 through a valve port 56 and with the Number 3 cylinder intake port 29 through a valve port 57. The relation of these ports are shown in Fig. 11, as taken on line 11—11 of Fig. 3.

The valve exhaust chamber 47 is capable of communicating with the manifold exhaust port 25 through a valve port 58 and with the Number 3 cylinder exhaust port 33 through a valve port 59. The relation of these ports are clearly shown in Fig. 12, as taken on line 12—12 of Fig. 3.

The valve exhaust chamber 47 is further capable of communicating with the manifold exhaust port 25 through a valve port 60 and with the Number 4 cylinder exhaust port 34 through a valve port 61. The relation of these ports are shown in Fig. 13, as taken on line 13—13 of Fig. 3.

The valve intake chamber 45 is capable of communicating with the manifold intake port 23 through a valve port 62 and with the Number 4 cylinder intake port 30 through a valve port 63. The relation of these ports are shown in Fig. 14, as taken on line 14—14 of Fig. 3.

The end plate 37 of the rotary valve 35 is provided with a shaft 64 which is mounted in suitable bearings 65 carried by the housing end plates 66. The rotary valve end plate 38 is provided with a trunnion 67 mounted in suitable bearings 68 supported by the housing end plate 69.

The rotary valve 35 is driven by means of a suitable chain 70, or its equivalent, which chain travels over a sprocket 71 fixed to the end 72 of the crank shaft 14 and a sprocket 73 fixed to the shaft 64 of the end plate 37 of the rotary valve 35. The sprocket 73 mounted upon the shaft 64 of valve 35 is of double the diameter of the sprocket 71 fixed to the end 72 of the crank shaft 14 so that two revolutions of the crank shaft will only cause one revolution of the rotary valve, as is manifest.

The chain 70 and sprockets 71 and 73 preferably travel in a bath of oil to be contained in the housing 74 which encloses the sprockets and the chain, as clearly shown in Fig. 3.

A plurality of packing rings 75 are carried by the rotary valve 35 so that a ring will be on opposite sides of each of the cylinder intake and exhaust ports, as clearly shown in Fig. 3, to prevent leakage of both intake and exhaust gases, as is manifest.

As clearly shown in Figs. 1 and 2, the reference character 76 indicates a manifold which is suitably fixed to the wall 20 of the valve housing 18. The manifold is provided with the end walls 77 and 78 and the partitions 79, 80, 81 and 82 to provide the intake gas chambers 83, 84 and 85 having communication with the manifold intake ports 21, 22 and 23, respectively, of the valve housing and with the intake manifold pipes 86, 87 and 88, respectively, which pipes terminate in a head 89 at their lower ends for connection to a carbureter. The manifold is also provided with the exhaust chambers 90 and 91, which communicate with the manifold exhaust chambers 24 and 25 of the valve housing and with the exhaust pipe 92, through the passages 93 and 94, respectively, of the manifold 76. The intake gases are first super-heated when they enter the intake gas chambers 83, 84 and 85 of the manifold 76, as is manifest, owing to the fact that the exhaust chambers 90 and 91 of the manifold are intermediate the intake passages as clearly shown in Fig. 2, and are further super-heated as they pass through the intake chambers 43, 44 and 45 of the rotary valve 35.

95 indicates a spark plug for each cylinder intake port 27, 28, 29 and 30. It will be observed that the center and ground electrode of each plug enters its respective cylinder intake port so that the inrush of fresh air and gas will have a tendency through the velocity thereof, to clean the electrode of carbon accumulations and keep them clean.

From the foregoing description and reference to Figs. 3 and 5, it will be understood, when referring only to cylinder 1, that the valve chamber 43 permits intake gases to pass through the rotary valve from the chamber 83 of the manifold 76, into cylinder 1, when the valve ports 48 and 49 register with the manifold and cylinder intake ports 21 and 27, respectively, and to exhaust the gases from cylinder 1 that the valve port openings 50 and 51 must register with the manifold and cylinder exhaust ports 24 and 31, respectively, so that the exhaust gases may enter and pass through the valve chamber 46.

Referring to all of the cylinders, the intake gases must pass through the valve chambers 43 to enter cylinder 1, through valve chamber 44 to enter cylinders 2 and 3 and through valve chamber 45 to enter cylinder 4. The exhaust gases in being discharged from cylinders 1 and 2 pass through the valve chamber 46 and in being discharged from cylinders 3 and 4 they pass through valve chamber 47, as will be understood from Fig. 3.

It will be observed that the valve ports of the intake valve chambers 43, 44 and 45 which register with the manifold intake ports 21, 22 and 23 are not in longitudinal alignment with the valve ports which register with the cylinder intake ports 27, 28, 29 and 30, and that the valve ports of the exhaust valve chambers 46 and 47 which register with the manifold exhaust ports 24 and 25, are not in longitudinal alignment with the valve ports which register with the cylinder exhaust ports 31, 32, 33 and 34.

The position of the rotary valve 35, as shown in Figures 2, 3, 5, and 8 to 14, inclusive, is the same in each view, thus giving a clear understanding, from an illustrative point of view, as to the positions of the several valve port openings when cylinder 1 is taking a charge, cylinder 2 exhausting, cylinder 3 compressing and cylinder 4 exploding. The firing arrangement, as illustrated in Fig. 3, is 1, 2, 4 and 3, thus when cylinder 1 is taking a charge, cylinder 2 is exhausting, cylinder 3 is compressing and cylinder 4 is under explosion.

From the foregoing description, it will be seen that a valve as herein described is adapted for a four cycle internal combustion motor and can be used, as is manifest, in single or multiple cylinder motors, as desired.

The many advantages of the herein described invention will readily suggest themselves to those skilled in the art to which it appertains.

I do not wish to be understood as having limited myself to the details of construction shown and described, but desire to have it understood that the invention I have shown in the drawings is merely illustrative, as it is manifest that various minor changes may be made in the exact construction and particular arrangement of parts without departing from the spirit of my invention, hence I reserve the right to make any such changes, or modifications as may fairly fall within the scope of the appended claim when fairly construed.

What I claim is:

The combination with a plurality of engine cylinders having water jackets and a crank-shaft, of a valve housing fixed to the engine block and provided with a water chamber communicating with the water jackets of the engine cylinders, said valve housing adapted to act as the cylinder head and provided in one of its side walls with a plurality of spaced manifold intake ports and provided intermediate each pair of manifold intake ports with a manifold exhaust port, the lower wall of said valve housing being provided with a plurality of cylinder intake ports and a pair of cylinder exhaust ports intermediate each pair of cylinder intake ports, said cylinder intake and exhaust ports being positioned to one side of the medial line of each engine cylinder, a tubular rotary valve mounted within the valve housing having removable end walls provided with end trunnions, bearing plates fixed to the ends of the valve housing for said trunnions to revolve in, a plurality of partitions intermediate said removable end walls to provide alternate valve intake and exhaust chambers in said rotary valve, said chambers having intake and exhaust ports, respectively, a shaft extending from one of the removable end walls of the tubular rotary valve and means for connecting said shaft with the crank-shaft for revolving the rotary valve in timed relation therewith.

In testimony whereof, I have hereunto signed my name to the specification.

WALTER H. MURPHY.